Patented Apr. 25, 1944

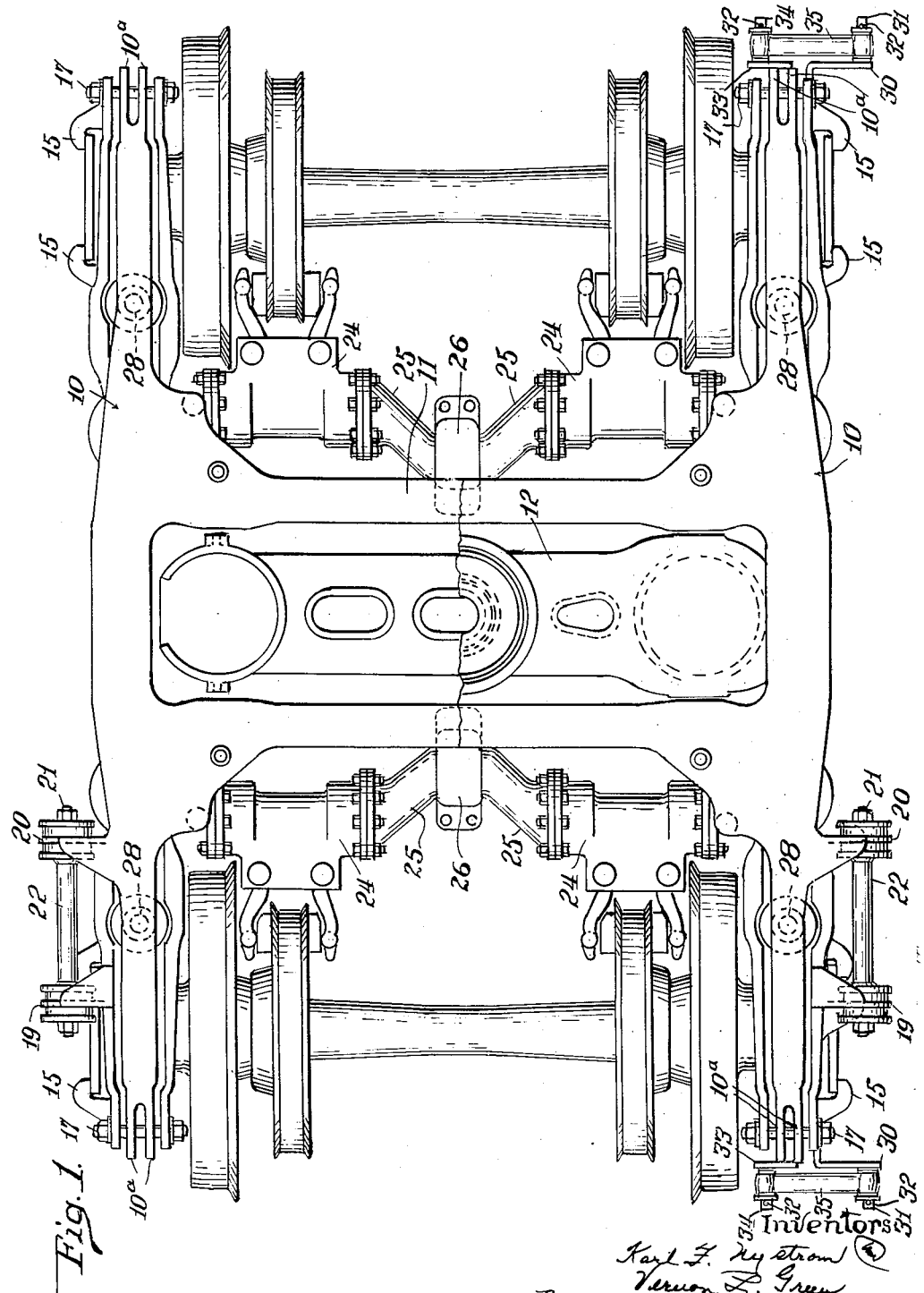

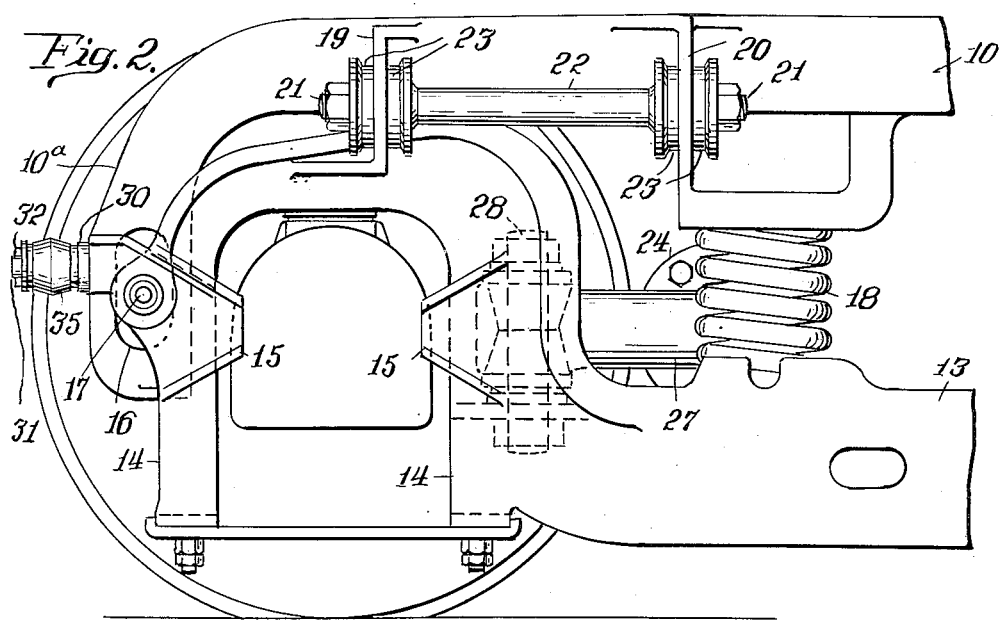
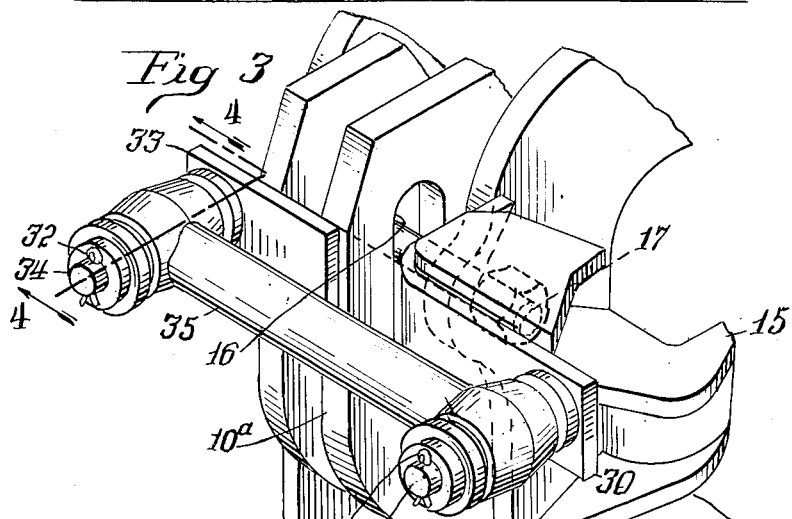
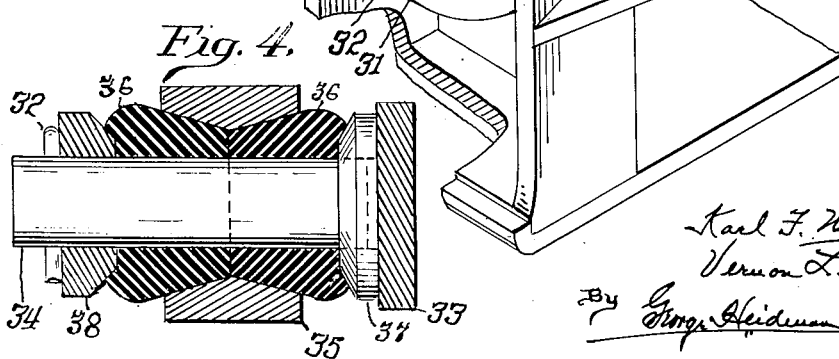

2,347,362

UNITED STATES PATENT OFFICE 2,347,362

RAILROAD PASSENGER CAR TRUCK

Karl F. Nystrom and Vernon L. Green, Milwaukee, Wis.

Application April 30, 1942, Serial No. 441,082

7 Claims. (Cl. 105—182)

Our invention relates more especially to the type of truck construction shown and described in our pending application Serial Number 410,357, which has since matured into U. S. Patent No. 2,334,024, granted November 9, 1943, involving a truck with equalizer units on which the truck frame is yieldingly supported; the equalizer units having journal bearing receiving portions or yokes and the two equalizer units being yieldingly connected to each other and to the truck frame by means which include the brake cylinders and which are of more or less C-shape formation and permit a twisting movement so that a wheel at one corner of the truck may drop without elevating the opposite wheel on the same journal or axle.

The present invention, more particularly stated, involves lateral tie means between the truck frame and one or both equalizer units, namely, at the ends of the frame and of the equalizer unit, or between the ends of the frame and the ends of both equalizer units, whereby torsional vibration of the frame relative to the equalizer units is prevented. That is to say, our improved construction is adapted to prevent vibration about the center plate of the truck; the invention being designed to maintain the proper lateral spaced relation between the truck frame and the equalizer units and hence eliminate any pounding action between the frame and the equalizer unit.

The objects and advantages of our invention will be readily comprehended from the following detailed description of the accompanying drawings wherein:

Figure 1 is a plan view of our improved truck with a portion broken away and in section.

Figure 2 is a side elevation of one end of the truck.

Figure 3 is a detail perspective view of one end of the truck frame and of the equalizer, at one side of the truck, and illustrating our improved tie means.

Figure 4 is a detail sectional view taken on the line 4—4 at one end of the lateral tie means and looking in the direction of the arrows, as shown in Figure 3.

Our invention, which relates to yieldable tie means between one or both equalizer units and the truck frame, is especially adapted to the type of railroad passenger car truck construction disclosed in our Patent No. 2,334,024, involving transversely disposed tie means of which the pneumatic brake cylinders form a part, although the invention may be applicable to a truck of somewhat different construction.

In the exemplification, the truck side frames 10 at their ends are shown bifurcated and disposed or curved downwardly as shown at 10ᵃ and the side frames are connected by the spaced transom members 11, 11 between which the bolster 12 is arranged. Each side of the truck is provided with an equalizer unit 13 whose ends curve upwardly and terminate in vertically disposed journal bearing receiving portions or yokes 14 in which the journal housings are mounted; outward movement of the housings being prevented by the overlapping and opposingly disposed lobes or portions 15, 15 arranged on the vertical portions 14 of the equalizer.

The ends of each equalizer unit or member 13 are bifurcated and straddle the ends 10ᵃ of the side frame 10, as more clearly shown in Figure 3, and the bifurcated portions 10ᵃ of the side frames preferably have vertical slots 16 to receive the pins or bolts 17 disposed through the bifurcated portions of the equalizer unit; the bolts and slots permitting free relative vertical movement between the truck side frames and the equalizer units and providing a safety means to prevent dissociation of the frame and the equalizer units in the event of a mishap.

The equalizer units, intermediate their ends, are provided with spring seats containing coil springs 18 whereby the truck frame 10 is yieldingly supported on the equalizer units.

The yoke portion 14 at one of the ends of each equalizer is shown provided with an outwardly disposed bracket 19 and the truck side frames at a predetermined distance removed from the yoke ends of the equalizers are also provided with outwardly disposed brackets 20; the brackets 19 and 20 preferably being formed integral, respectively, with the equalizer and the side frame and having substantially aligned openings to receive the ends of the longitudinally disposed tie member or rod 21 which extends through a sleeve 22 provided with washers at its ends and through the rubber pads or discs 23 arranged on opposite sides of the brackets; the rod 21 at the ends of the sleeve 22 and on the opposite or outer sides of the brackets 19 and 20 having metal washers whereby the rubber discs or pads 23 are placed under compression; the tie means providing a resilient and noiseless connection between the frame and the equalizer units adapted to absorb longitudinal thrusts; a similar longitudinally disposed tie means being provided at the opposite side of the truck and preferably at the same end of the truck, as shown in Figure 1.

The truck illustrated involves what is known as "off-the-wheel" type brake mechanism having pneumatic cylinders 24 whose inner ends are connected by the offset connecting piece 25 whose intermediate portion extends through a suitable housing or bracket 26 which is suitably secured to the transom member 11 substantially at the longitudinal center line of the truck and hence in line with the center bearing of the bolster 12; the connecting piece 25 being permitted restricted rotative movement in the housing 26. The outer ends of the cylinders are each provided with an angular arm 27 whose outer end, which extends substantially parallel with the equalizer and frame, is pivotally connected with the adjacent equalizer unit through the medium of a vertically disposed pin 28 which preferably is provided with rubber bushings. As shown in Figure 1, a similar combination brake cylinder and tie unit is yieldingly suspended from each transom member thereby eliminating the use of other transverse ties; the combination somewhat C-shape tie units being symmetrically arranged about the center line of the truck.

These combination units permit a twisting movement which enables a wheel at one corner of the truck to drop without elevating the opposite wheel on the same axle; the drop being permitted by the three point suspension which all involve shock absorbing rubber elements under compression.

In order to prevent a torsional vibration being set up between the frame and the equalizer units during high speed operation, which has a tendency to rotate the truck frame about the center plate, it has been found advisable to provide suitable tie means between the frame and the equalizer units which, however, will permit sufficient and the desired amount of vertical independent relative movement between the frame and the equalizer units.

In the particular exemplification, the lateral tie means have been arranged at two ends of the truck and preferably on the same side thereof as shown in Figure 1. The tie means, disclosed in each instance, consists of a suitable extension or angular bracket 30 which may be formed integral with or welded to one of the bifurcations at the end of the equalizer unit with its free end disposed toward the outer side of the truck and provided with a longitudinally arranged pin 31 which is preferably immovably secured to or welded on the extension or bracket 30, with its outer end apertured to receive a cotter or other suitable pin 32.

The bifurcated end of the truck side frame is provided with a transversely extending extension or bracket 33, disposed inwardly and the end provided with a pin 34 immovably secured to the bracket and disposed longitudinally and substantially parallel with pin 31; the outer end of pin 34 also being apertured to receive a cotter-pin 32.

The pins 31 and 34 receive the apertured or eyeletted ends of the link or bar 35 which may be of any suitable cross-sectional configuration, with the eyeletted ends preferably provided with tapered or cone-shape walls, as shown in Figure 4, adapted to compress the rubber bushings 36 into firm frictional relation with the pins 31 and 34 (both ends of link 35 being similar).

The inner ends of both pins 31 and 34 are each preferably provided with a beveled base portion 37; while the outer end of each pin preferably is provided with a beveled washer 38; the tapered or beveled surface of the openings in the link 35 and of the pins and washers combinedly tend to compress the rubber bushings 36, as shown in Figure 4.

The construction shown provides a non-metallic connection between the lateral bars or links and the ends of the equalizer unit and truck frame; the rubber bushings absorbing vibrations and preventing chatter between the links or bars and the pins.

The exemplification of the invention as shown and described is believed to be its simplest embodiment but certain modifications are possible and may be made without, however, departing from the spirit of our invention as defined in the appended claims.

What we claim is:

1. In a railroad car truck having a journal bearing housing holding equalizer unit at each side whereby the equalizer and journal bearing housing move vertically together and are held against relative movement longitudinally of the truck, an H-shape load carrying truck frame yieldingly supported on the equalizer units and free of association with the journal bearing housings except through the equalizer units, vertically yieldable tie means secured intermediate its ends to the truck frame and at its ends to the equalizer units; laterally disposed extensions at the ends of the frame on one side of the truck and at the ends of the equalizer unit on the same side of the truck; tie bars pivotally secured at the ends to the extensions of the frame and to the extensions of the equalizer unit whereby rotative vibration of the frame is prevented and a predetermined degree of relative vertical movement between the frame and the equalizer unit is permitted; and vibration absorbing cushion elements secured at the pivoted ends of the tie bars.

2. In a railroad car truck, the combination of a pair of equalizer units arranged at the sides of the truck, the ends of the units being bifurcated and the bifurcations formed to provide journal bearing housing receiving yokes; a truck frame yieldingly supported on the equalizer units and composed of side frames connected intermediate their ends by a transverse transom, the ends of the truck side frames being arranged between the bifurcations of the respective equalizer units; tie means between the equalizer units at opposite sides of the truck, yieldingly suspended intermediate the ends from the transom and yieldingly secured at the outer ends to the equalizer units; and lateral tie means between a bifurcation of an equalizer unit and the adjacent end of the side frame whereby torsional vibration of the frame relative to the equalizer unit is prevented and a predetermined amount of relative vertical movement between the frame and the equalizer unit is permitted.

3. In a railroad car truck having equalizer units at the sides, the ends of the units being bifurcated and terminating in vertically disposed journal bearing housing receiving yokes; a truck frame yieldingly supported on the equalizer units, with its ends disposed between the bifurcations of the equalizer unit on the same side of the truck; tie means disposed transversely of the truck, yieldingly secured intermediate the ends to the frame to permit vertical oscillatory movement and having vertically disposed pivotal connections at the ends with the equalizer units; extensions at the ends of the frame and one of the bifurcations of the equalizer unit on the same side of the truck; and laterally disposed tie bars pivotally connected at the ends to said extensions, the pivotal connections involving rubber bushings and bushing compressing tapered elements.

4. In a railway truck, an axle and wheel, a journal box carried thereby, an equalizer supported upon the journal box and extending longitudinally of the truck, the equalizer and journal box being movable together vertically of the truck and being held against relative movement longitudinally of the truck, a load carrying truck frame spring-supported on the equalizer and free of association with the journal box except through the equalizer, and an elongated anchor rod extending transversely of the truck and connected at its end portions to the end portion of the equalizer and to the load carrying frame to hold the equalizer and load carrying frame against substantial movement relative to each other transversely of the truck but accommodating their movement relative to each other in a vertical direction.

5. In a railway car truck having an equalizer unit at the side terminating in journal housing bearing receiving yokes; an H-shape truck frame yieldingly supported on the equalizer unit and free of association with the journal housings except through the equalizer unit; laterally disposed extensions at the ends of the truck frame and at the ends of the equalizer unit, the extensions at the ends of the frame at one side and the corresponding equalizer unit being each provided with a longitudinally disposed pin; and tie bars pivotally mounted at the ends on said pins adapted to permit a predetermined degree of relative vertical movement between the frame and the equalizer unit and to prevent rotative vibration of the frame, the pivotal connections of said tie bars involving rubber bushings and bushing compressing elements.

6. In a railroad car truck provided with equalizer units at opposite sides and provided with journal bearing receiving portions, the equalizer units and journal bearings being movable together; a load carrying truck frame yieldingly supported on the equalizer units and free of association with the journal bearings except through the equalizer units; transversely disposed tie means yieldingly secured to an intermediate portion of the truck frame with the ends pivotally secured to both equalizer units; vertically movable tie means pivotally secured at one side of the truck to the end of the truck frame and to the adjacent end of one of the equalizer units whereby substantial rotative movement between the truck frame and the equalizer unit is prevented and a predetermined amount of relative movement in a vertical direction between the frame and the equalizer unit is permitted.

7. In a railroad car truck, the combination of axles and wheels, journal boxes carried thereby; equalizers supported upon the journal boxes and extending longitudinally of the truck, the equalizers and journal boxes being movable together vertically of the truck and held against relative movement longitudinally of the truck; a load carrying truck frame spring-supported on the equalizers and free of association with the journal boxes except through the equalizers, said frame having longitudinally disposed side members united intermediate their ends by a transverse transom; transversely disposed brake cylinder carrying tie means yieldingly secured intermediate the ends to the frame-transom and pivotally secured at the ends to the equalizers; a tie bar disposed transversely of the truck with its ends pivotally secured to a frame side member and the adjacent end of an equalizer, adapted to hold the equalizer and load carrying frame against substantial rotative movement but accommodating their movement relative to each other in a vertical direction; and non-metallic vibration absorbing means arranged at the pivoted ends of the tie bar.

KARL F. NYSTROM.
VERNON L. GREEN.